March 17, 1964   C. E. THOMPSON ET AL   3,125,468
COATED ELECTRODES
Filed April 4, 1960

Charles E. Thompson
Joseph M. Kelley, Jr.
Inventors

By Olin B. Johnson
Patent Attorney

United States Patent Office 3,125,468
Patented Mar. 17, 1964

3,125,468
COATED ELECTRODES
Charles E. Thompson, Fanwood, and Joseph M. Kelley, Jr., Westfield, N.J., assignors to Esso Research and Engineering Company, a corporation of Delaware
Filed Apr. 4, 1960, Ser. No. 19,566
16 Claims. (Cl. 136—86)

This invention relates to improvements in systems wherein combustible fuels are oxidized and a substantial portion of the resulting energy of oxidation is converted directly, i.e. via electrochemical reaction, to electrical energy.

In particular, this invention relates to the discovery of a novel and highly efficient electrode for use in the oxidation of a fuel gas or liquid in a fuel cell, to apparatus for the generation of electrical energy wherein such electrodes are employed, to the operation of fuel cells wherein such electrode is employed and the methods of preparing such electrodes.

More particularly, this invention relates to fuel cell electrodes comprising a porous electron conductor, a catalyst, and a high molecular weight polymer.

Electrical energy can be produced directly from organic compounds by electrochemical reaction. The vehicle for carrying out such reactions has become known in the art as the "fuel cell." With a conventional primary battery, the electrical energy withdrawn from the cell is derived from a reaction of the electrodes which are consumed or at least chemically modified until the cell no longer will function. The fuel cell differs from other primary batteries in that the electrical energy withdrawn from the cell is derived from a combustible fuel continuously or intermittently supplied to the cell which is also supplied with an oxidizing gas.

The requisites of an operating fuel cell include two or more electrodes, an electrolyte, an oxidizing gas and a supply of combustible fuel.

In fuel cell operations an electrode through which a source of oxygen is introduced to the cell is commonly known as an "oxygen electrode." An electrode through which a combustible fuel is introduced to the cell or which accepts electrons from fuel admitted directly to the electrolyte is commonly known as a "fuel electrode." When employed herein, the term "cathode" shall be understood to refer to the "oxygen electrode," and the term "anode" shall be understood to refer to the "fuel electrode."

The maximum difference in potential between the electrodes of an individual cell is limited by the free energy change occurring in the reaction taking place in the cell. Most practical applications for the fuel cell therefore envision the use of a number of individually small cells connected in series and/or parallel. The desideratum therefore is a cell having as high a capacity as possible per unit volume.

An individual fuel cell is ordinarily made up of a cell container, two conducting electrodes consisting of or impregnated with a material having a catalytic effect upon the desired electrochemical reactions, insulators, connecting means associated with each electrode for establishing electrical contact with an external circuit, means for introducing an oxidizing gas to a cathode, means for introducing a fuel to an anode, and an electrolyte.

Suitable electrolytes include acidic electrolytes such as aqueous solutions of $H_2SO_4$, $H_3PO_4$, HCl, $HNO_3$, peracetic acid and other strong acids, aqueous solutions of strong bases such as KOH, NaOH, LiOH, etc., and aqueous carbonate electrolytes, e.g. $K_2CO_3$—$KHCO_3$, $Na_2CO_3$—$NaHCO_3$, etc.

Suitable fuels include liquid and gaseous hydrocarbons, oxygenated hydrocarbons, e.g. alcohols, ketones, aldehydes, carboxylic acids, etc., carbon monoxide and hydrogen.

Oxygen is reacted with the aqueous solution of electrolyte to form negatively charged ions at the oxygen electrode, fuel is oxidized at the fuel electrode where carbon dioxide and/or water is formed and free electrons are released upon a conducting surface of the fuel electrode. When current is drawn from the cell, there is a net flow of electrons from the fuel electrode (anode) through the external circuit to the oxygen electrode (cathode). The electrodes of this invention are suitable for use in any cell of this type employing an aqueous electrolyte and a liquid or gas fuel.

Electrochemical reaction at the fuel electrode occurs where the catalyst, the electrolyte and the fuel are simultaneously exposed to each other. It is therefore necessary for electrodes to provide high surface areas per unit of volume. One method for obtaining high surface areas per unit of volume is to employ a foraminated or porous body as the principal structure of the electrode. Where such body is of a material which also provides the desired catalytic activity, the electrode may be entirely prepared from such material. However, where the conducting material, i.e. the body of the electrode, does not provide such catalytic effect, it is necessary to either physically or chemically associate with the conducting material one or more additional materials which will accomplish this function.

In the operation of a fuel cell employing an aqueous electrolyte and a gaseous fuel and/or oxidant, wherein such fuel and/or oxidant is brought into contact with the electrolyte by diffusion through a porous or foraminated electrode body, reaction rates are enhanced if a portion of the pore volume is filled with such fuel or oxidant while another portion of the pore volume is filled with liquid electrolyte. By providing a proper liquid gas distribution within the pores of the electrodes, it is possible to achieve within a small volume a high number of contact points wherein fuel, oxidant, and catalyst are simultaneously exposed to each other. If all pores are filled with gas, the only contact with the electrolyte will be at the exterior surface of the electrode. On the other hand, if essentially all of the pores become flooded with the liquid electrolyte, reaction at this electrode will be materially reduced if not stopped completely.

After a cell has been operating for a period of time, the surfaces of the larger gas filled pores, particularly in the cathode, tend to become more hydrophylic which results in the entry of liquid electrolyte into such pores. This has an undesirable effect upon the proper gas-liquid distribution within the electrode with the aforementioned effects of flooding.

It has now been discovered that electrode flooding can be materially reduced by polymerizing in situ upon the walls of the larger pores of a porous electrode a high molecular weight polymer, preferably a polymer having a viscosity molecular weight of about 50,000 to 1,000,000 or more.

Reducing the hydrophylic properties of the pores employed for gas transmission will increase the effectiveness of any porous fuel cell electrode wherein a system of connecting pores is employed to provide multiple contacts between catalyst, aqueous electrolyte and gaseous reactant. When this is effected by forming a high molecular weight polymer in situ upon the surfaces of the larger pores, the composition of the surface must be such that the polymer can be chemically and/or physically bonded to such surface to withstand long periods of use in an operating cell.

Porous carbon electrodes, particularly when employed as the cathode of a fuel cell, are subject to flooding after short periods of use. The instant invention is exemplified by the improved performance of porous carbon electrodes upon which a high molecular weight hydrocarbon polymer has been formed in situ. It should be understood, however, that the polymers formed need not consist exclusively of carbon and hydrogen. Suitable polymers include any polymer having a low free surface energy that will remain stable under fuel cell operating conditions and which can be formed upon the pore walls without clogging and destroying the intended function of such pores. Such polymers include silicone polymers and polymers of halogen substituted hydrocarbon monomers, e.g. tetrafluoroethylene. Consideration must, of course, be given to the processes known to the art for polymerizing the chosen monomer, i.e. catalysts and conditions known to be operable.

Coatings formed by polymerization in situ have the advantage of providing a stronger bonding of coating to pore surfaces than monomeric compounds which are merely adsorbed on the surface and hence are less susceptible to displacement by the electrolyte.

The process of this invention is preferably carried out after the porous electrode has been impregnated with the desired catalyst for the intended fuel cell reaction. The process is controlled so as not to form polymer within the smaller pores wherein the catalyst remains exposed to the reactants. Hydrocarbon polymers having a molecular weight in the range of about 50,000 to 1,000,000 or more having a free surface energy close to or below that of polyethylene are suitable for electrode coating. Among these are polymers and copolymers of ethylene, propylene, 3 methyl butene-1, 4 methyl pentene-1, and 4,4 dimethyl pentene-1.

The polymer is formed in the larger pores of the electrodes by first depositing a polymerization catalyst in these pores and then allowing just enough monomer to come into contact with the catalyst to form a thin film of the polymer on the walls of the pore. The polymerization catalyst may be deposited on the larger pores in the following manner. The electrode is first filled with an inert gas such as nitrogen and the gas-filled electrode is immersed in a dilute solution of the polymerization catalyst followed by a reduction in the gas pressure on the system to a degree sufficient to allow a flooding of the large pores by the solution. The polymerization catalyst is then adsorbed from the solution. The polymerization of hydrocarbon monomers may be carried out at room temperature. A suitable range for hydrocarbon polymerization extends from about 20° to 100° C. A good distribution of gas and liquid within an operating fuel cell electrode can be achieved by coating pores having a diameter of 8000 A. and larger.

The catalyst may be of any material that will cause polymerization of the desired monomer on the electrode surface. It may be a complex catalyst derived from an alkyl metal compound where the metal is from groups I, II or III of the periodic table, particularly aluminum trialkyl compounds having 1 to 18, preferably 1 to 5 carbon atoms, and a reducible transition metal compound where the metal is from groups IV-B, V-B, and VI-B of the periodic table. Such catalysts are described in detail in U.S. Patent 2,827,445. The film of polymer should be in the range of from 2 to about 1000, preferably 2 to 200, millimicrons in thickness.

The polymers formed in situ by this process are suitable for use in fuel cells operating up to temperatures at which the polymer melts or begins to decompose, e.g. cells operating from below about room temperature (77° F.) to about 400° F.

Porous carbon if properly utilized provides an excellent base for fuel cell electrodes. Connecting pores of different sizes provide opportunity for a high number of contacts between a liquid and a gas. Carbon electrodes can be used with both acidic and basic electrolytes. Carbon provides a conductor from which free electrons released in the fuel cell reaction can be withdrawn from the cell.

Catalysts which may be chemically and/or physically associated with porous carbon structures for use in the production of fuel cell electrodes may include a metal of groups I-B, V-B, VI-B and VIII of the periodic table, e.g. chromium, tungsten, molybdenum, cobalt, nickel, gold, silver, copper, platinum, palladium, rhodium, iridium, other metals such as manganese, and inorganic compounds containing one or more of such metals, e.g. $NiO$, $MnO$, $CoMoO_4$, $V_2O_5$, etc. At the cathode, the noble metals and metal oxides such as combinations of $NiO$ and $LiO$ are preferred. At the anode, the preferred catalysts are cobalt molybdate, and platinum or platinum comprising catalysts. It should be understood, however, that such catalysts are not equivalents and that each of these has its own level of activity.

A suitable method for impregnating a carbon structure with the desired catalytic component is carried out by soaking the carbon structure in an aqueous solution containing the catalytic element for a period of time in the range of about 0.5 to about 6 hours or more. The cylinder is then fully dried. This may be effected by employing a temperature in the range of about 200° to 400° F. for a period of time in the range of about 2 to 24 hours. The dry cylinder is then heated to a temperature of about 400° to 2000° F. under a stream of nitrogen or other gas chemically inert to carbon and the catalytic material at such temperatures for about 2 to about 6 hours to decompose soluble salts of the catalytic material to their elemental form or other oxides or sulfides thereof thus rendering the catalytic material essentially insoluble in the electrolytes suitable for use with this invention.

When the sulfides are to be used, the carbon is impregnated in the usual manner, dried, and hydrogen sulfide gas is then passed through the pores of the carbon cylinder under the particular reaction conditions required to effect the reaction of hydrogen sulfide with the previously adhered catalytic material. These conditions are, of course, well known to the art. The thus treated electrode may then be reduced in hydrogen at a temperature in the range of about 400° to about 1200° F. for a time in the range of about 2 to about 12 hours.

When it is desired to leave the catalytic material bonded to the carbon in compound form, e.g. cobalt molybdate, this reduction step is eliminated. By this method the carbon structure can be impregnated with the catalytic material to the extent that the catalytic material will constitute between 0.1 and 30 wt. percent of the completed electrode. The percentage will vary within this range in accordance with the catalytic component employed. For example, when a noble metal such as platinum or gold is employed, the impregnated electrode will contain between 0.1 and 5 wt. percent of the catalyst whereas when transition elements of groups VI and/or VIII of the periodic table or combinations of these elements are used, the catalyst will usually comprise from about 1 to 30, preferably 5 to 15 wt. percent of the electrode.

While the technique of forming a high molecular weight polymer in situ upon walls of the larger pores may be advantageously employed with any porous carbon structure superior performance is achieved in the fuel cell by employing carbons wherein the maximum pore diameter does not exceed about $4 \times 10^5$ A. These electrodes preferably are prepared so that about 20 to 80, preferably 30 to 70, percent of the pore volume within a unit volume of carbon is formed by pores having diameters in the range of about $0.2 \times 10^4$ A. to $2 \times 10^5$ A. and 20 to 80, preferably 30 to 70, percent of the pore volume is formed by pores having diameters in the range of about 50 to 400 A.

Such electrodes may take on a variety of forms in accordance with the overall engineering of the cell. Thus, they may comprise a hollow cylinder or a plate-like structure which may be either flat, angular, or curved. Such electrodes may be designed so that the catalyst impregnated porous carbon mass constitutes only a portion of the entire electrode when the particular reaction desired or the engineering of the cell requires that other materials be employed in conjunction with the carbon mass, e.g. to lend structural strength.

High density carbon structures suitable for use as a starting material in the production of these electrodes are commercially vailable. They are characterized as having an apparent density in the range of about 1.2 to 2.1 grams/cc., a tensile strength in the range of 1000 to 3000 p.s.i., a porosity in the range of 10–30% and a maximum pore diameter of below about $4 \times 10^5$ A. Of these, those having a maximum diameter of below about $2 \times 10^5$ A. are preferred. Excellent sources of such carbon structures are those marketed under the trade names of Purebon, P–5; Purebon L–50–S, and Purebon, E–9. High density structures suitable for use in making these electrodes can be prepared by mixing fine particles of graphite and calcined coke or graphite and lampblack with a suitable binding material such as pitch or cellulosic materials by methods well known in the art. The particles should be of as nearly uniform size as possible. The mixture may be molded into the desired shape under pressures in the range of about 1–30 tons/sq. in. by techniques well known in the art and the formed structures are then heated slowly by raising the temperature gradually over a period of several days to a temperature in the range of about 1000° to 2500° F. Other methods well known to those well skilled in the art are also available for the production of such high density carbon structures. The pore diameters are smaller and more uniform in these high density structures than in carbons of lower density. The oxidation process to which such structures are subjected in the preparation of electrodes, which is hereinafter described in detail, is controlled so as to increase the existing porosity by not more than 30% to a total porosity after oxidation in the range of about 10 to 35%.

A suitable method for carrying out the aforesaid oxidation consists of heating a high density mass of porous carbon of the desired shape and construction in an enclosed heating zone at a temperature in the range of 600° to 900° F. for a period in the range of about 1–10 hours in the presence of an oxygen-containing gas such as air or molecular oxygen. The gas may be introduced either continuously or intermittently, preferably continuously, in such amounts that the total amount of oxygen introduced is in the range of 2–80% of the weight of carbon subjected to oxidation. The oxidation may also be effected by heating the carbon with carbon dioxide at temperatures in the range of 1600° to 2000° F. for a period in the range of about 1 to 10 hours. Otherwise phrased, the oxidation is continued until the weight of the high density carbon has been decreased in the range of about 1–30 wt. percent. Impregnation of the carbon mass with the desired fuel cell catalyst as hereinbefore discussed is carried out after such oxidation is effected.

For a better understanding of the present invention, its objects and advantages, reference should be had to the accompanying drawings in which electrodes prepared in the manner hereinbefore described are illustrated with reference to an operating cell.

Figure 1:
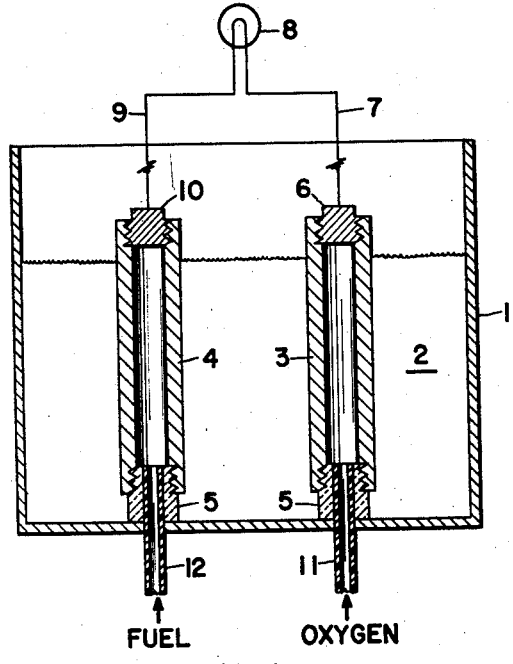
FIGURE 1 is a diagrammatic vertical section of a fuel cell wherein cylindrical diffusion type electrodes are employed in a system using an aqueous electrolyte and a gaseous fuel.

Referring now to FIGURE 1, one embodiment of the invention is carried out in the following manner: Into fuel cell container 1, a vessel constructed of stainless steel, containing an aqueous electrolyte solution 2, e.g. about 27 wt. percent potassium hydroxide, are emersed an "oxygen" electrode 3 and a "fuel" electrode 4. The electrodes are hollow cylinders impregnated with a catalytic material of the type hereinbefore described. The aqueous solution of potassium hydroxide 2 serves as an electrolyte and is maintained at a temperature in the range of about 77° to 500° F. Electrodes 3 and 4 are insulated from container 1 by conventional porcelain insulators 5 threaded and shaped to fit into threads in the bottom of the electrodes. The top portions of electrodes 3 and 4 are in electrical contact with connecting means 6 and 10 respectively which in turn are respectively in electrical contact with copper wires 7 and 9. Wires 7 and 9 are also in electrical contact with conventional resistance means 8 respresenting an external load, e.g. an incandescent lamp, electric motor, etc., for utilizing the power output of the cell and completing the external circuit. Connecting means 6 and 10 are constructed of copper, silver, stainless steel, or similar materials which are good conductors of electrical current and are here in the form of plugs or screws shaped to fit into threads formed into the top parts of electrodes 3 and 4. Portions of electrodes 3 and 4 are shown cut away to reveal the hollow nature of the electrodes and the porous structure of their walls. The cell is operated at 1 to 50 atmospheres pressure.

Oxygen gas is passed through conduit 11 into the interior of electrode 3 from whence it diffuses through the pores or tortuous passageways in the carbon wall to contact the electrolyte which also enters the electrode through the smaller pores thereof. A hydrocarbon gas is passed through conduit 12 into the interior of electrode 4 and diffuses in like manner through the pores of the electrode and contacts the aforesaid electrolyte. An electrochemical reaction is thereby initiated and electrical current is generated by such reaction and passed through the external circuit. Conduits 11 and 12 may be conventional glass, metal or plastic tubing. Fuel and oxygen feeds are maintained at a pressure sufficient only to keep the electrolyte out of the larger pores in the electrodes.

Figure 2:
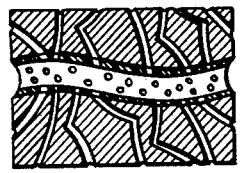
FIGURE 2 is a greatly magnified illustration of a cross sectional view of a porous carbon electrode having connecting large and small pores wherein the larger pore is coated with a high molecular weight polymer formed in situ.

FIGURE 2 is designed to show a larger pore which is filled with gas during operation of the cell and a large number of small pores intersecting the larger pore in which liquid electrolyte overcomes gas pressure thereby creating a multitude of contact points between the oxidant or fuel and the electrolyte where such pores intersect the larger gas filled pore. The larger pore is coated with a thin layer of a high molecular weight polymer formed in situ.

Figure 3:
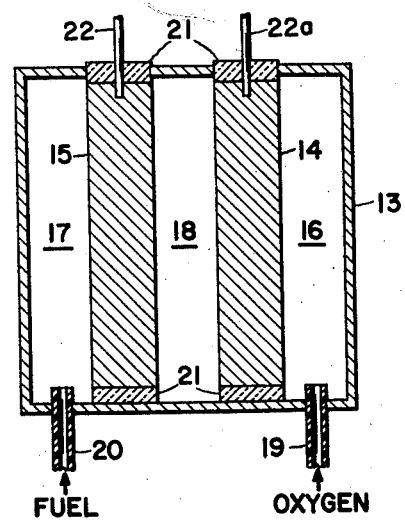
FIGURE 3 is a diagrammatic vertical section of a fuel cell wherein the conducting electrode is a plate-like structure which may be either flat, angular or curved in accordance with desired embodiments of this basic design.

In FIGURE 3, a cell employing plate-like electrodes, the space inside cell container 13 is divided by a porous cathode, i.e. oxygen electrode 14, and a porous carbon, cobalt molybdate impregnated anode, i.e. fuel electrode 15, into an oxygen receiving zone 16, a fuel receiving zone 17 and electrolyte compartment 18. Oxygen is introduced into oxygen receiving zone 16 via conduit 19. Fuel gas is introduced into fuel receiving zone 17 via conduit 20. Electrodes 14 and 15 are insulated from cell container 13 by conventional insulators 21. Connecting means 22 and 22A form the beginnings of an external circuit.

Figure 4:
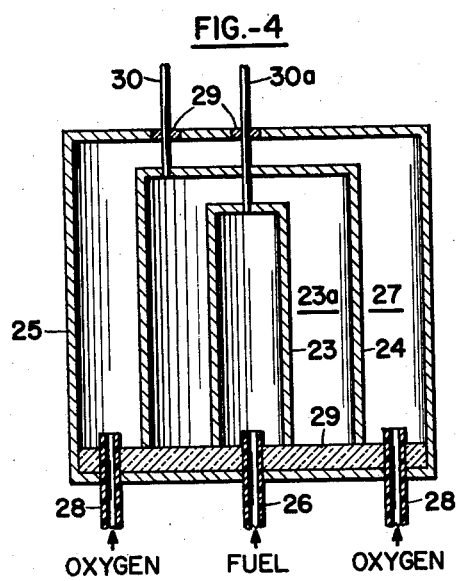
FIGURE 4 is a diagrammatic vertical section of a fuel cell wherein the fuel electrode is a hollow cylinder situated within the central cavity of a larger cylinder serving as the oxygen electrode.

In a cell of the type shown in FIGURE 4, a porous carbon-cobalt molybdate containing hollow cylinder 23 is situated inside a larger porous cylinder 24 which serves as the "oxygen electrode." Oxygen electrode 24 is in turn surrounded by cell container 25. A fuel gas is introduced into the interior of electrode 23 via conduit 26.

Oxygen is introduced into an oxygen receiving zone 27 between electrode 24 and cell container 25 via conduit 28. An aqueous electrolyte 23A separates electrodes 23 and 24. Electrodes 23 and 24 are insulated from cell container 25 by conventional insulating means 29. Connecting means 30 and 30A form the beginnings of an external circuit for withdrawing electrical power from the cell.

Aside from the differences in construction, the operation of the cells shown in FIGURES 3 and 4 is essentially the same as that described with reference to the cell shown in FIGURE 1.

Figure 5:
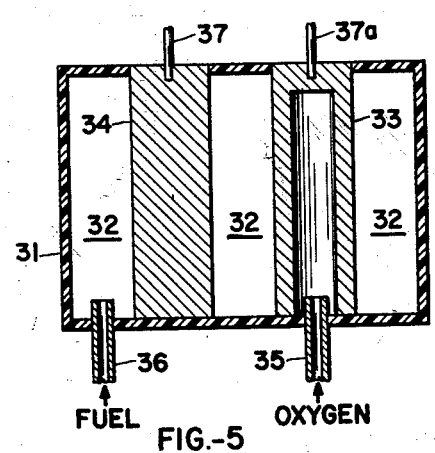
FIGURE 5 is a diagrammatic vertical section of a fuel cell for use in a system wherein a liquid fuel is admitted to the electrolyte before contacting the fuel electrode.

FIGURE 5 represents a somewhat different type of cell which is suitable for use with a liquid fuel, e.g. liquid hydrocarbons or oxygenated hydrocarbons such as alcohols, ketones, aldehydes and carboxylic acids. In FIGURE 5, the cell container 31 encloses an aqueous electrolyte 32 in which are emersed a cathode 33 in the form of a hollow structure, e.g. porous carbon impregnated with about 1 wt. percent platinum, and a porous carbon and cobalt molybdate anode 34. Oxygen is admitted to the interior of electrode 33 via conduit 35. A liquid fuel, e.g. methanol, is introduced into electrolyte 32 via conduit 36. Connecting means 37 and 37A represent the beginnings of an external circuit for removing an electrical current from the cell. Since a distribution of both gas and liquid within the "fuel electrode," i.e. the anode, is not required here, the existence of dual porosity is not of the importance in a cell of the type shown in FIGURE 5 that it is in the cells employing a gaseous fuel. However, it is still desirable. Maximum area of contact between fuel electrode and the liquid fuel is here the major consideration, but effective distribution throughout the electrode is enhanced by the existence of an appreciable number of larger feeder pores.

The following examples are presented for purposes of illustration only and the details therein should not be construed as limitations upon the true scope of the invention as set forth in the claims.

EXAMPLE 1

Carbon cylinders and plates having an apparent density in the range of 1.2 to 2.1 grams/cubic centimeter, a porosity of about 15%, and a tensile strength of about 1200–1500 p.s.i. are prepared by thoroughly mixing 40 to 60 parts of graphite and 40 to 60 parts of calcined coke particles that will pass through a standard 200 mesh screen with a coal tar pitch binder, drying the resulting mixture, grinding the dried mixture to a fine powder, molding the powdered mixture into conventional shapes under a pressure of about 7–10 tons per square inch, and sintering the compressed carbon mass by gradually increasing the temperature over a period of about 7 days to about 1800° F. These carbon structures are then machined to the size and shape desired.

A number of porous carbon cylinders and flat plates prepared in accordance with this method are weighed at room temperature, heated in an oven at an average temperature of about 1832° F. for 6 hours with $CO_2$ being introduced into the oven at the rate of 100 cubic centimeters/minute. The cylinders and plates are found to have decreased about 7.5% during the treatment. The maximum pore diameter of the carbon mass is found to be below $4 \times 10^5$ A. and the actual density is in the range of about 1.9 to 2.25 g./cc.

The cylinders and plates are found to have an internal surface area, i.e. pore surface area, of 100 to 300 square meters/gram, and a pore size distribution wherein about 30–40% of the pore volume results from pores having a diameter of between 50 and 400 A. and about 45–60% of the pore volume results from pores having diameters in the range of $0.2 \times 10^4$ A. to $2 \times 10^5$ A.

A high density carbon mass prepared in accordance with the aforerecited method is soaked in an aqueous solution of ammonium molybdate for about 6 hours. The carbon mass is dried and then heated under nitrogen gas to decompose the ammonium molybdate to $MoO_3$ and then heated further to a temperature of about 1225° F. to redistribute the $MoO_3$ over the surface of the carbon. The carbon mass is then soaked in an aqueous solution of cobalt acetate for about 6 hours and again heated to a temperature of about 1225° F. under nitrogen. This treatment leaves $CoMoO_4$ bonded to the carbon mass.

The catalyst impregnated carbon structure is then purged with nitrogen gas and immersed in a 0.84 molar solution of $TiCl_4$ in heptane. The pressure is then reduced to about 15 centimeters mercury Hg. After 2 minutes the system is pressured with nitrogen to 1 atmosphere. The electrode is washed free of unadsorbed $TiCl_4$ by immersing the electrode in normal heptane, reducing the pressure to 15 centimeters mercury and displacing the wash liquid by pressuring the cylinder with nitrogen. The cylinder is then immersed in a 0.84 molar solution of aluminum triethyl, xylene and n-heptane and the pressure reduced to 15 centimeters mercury. This solution is then displaced from the cylinder by nitrogen and the cylinder is next immersed in a saturated solution of ethylene in n-heptane, i.e. saturation at atmospheric pressure, and the pressure reduced to 15 centimeters mercury. The volume of this solution is such that a polyethylene film is formed on the surface of the carbon in a layer found to be 20 to 25 A. in thickness. The polymerization catalyst is then decomposed by contacting the catalyst with isopropyl alcohol and reducing the pressure to 15 centimeters mercury. Nitrogen gas is then admitted to the interior of the electrode under pressure displacing the alcohol from the pores. The cylinder is dried and the electrode is then ready for use in a fuel cell. The polymerization is carried out at a room temperature of about 25° to 30° C.

EXAMPLE 2

An electrode is prepared as in Example 1 except that the catalyst left on the carbon mass is platinum. This is effected in the following manner. Before forming the high molecular weight polymer in situ upon the large pores the carbon mass is soaked in a 10 wt. percent aqueous solution of chloroplatinic acid, dried at 230° F., heated for about 2 hours at 800° F. under a stream of nitrogen and reduced by heating in hydrogen gas at 900° F. until the carbon mass is impregnated with elemental platinum. The impregnated carbon mass is found to contain 1.16 wt. percent platinum. Polyethylene is then formed in the larger pores as in Example 1.

EXAMPLE 3

An electrode is prepared as in Example 1 except that it is impregnated with a palladium catalyst by soaking the oxidized cylinder in a 10 wt. percent aqueous solution of palladium nitrate, decomposing the nitrate by heating under nitrogen and reducing the palladium oxide with hydrogen gas at about 900° F. The impregnated carbon mass is found to contain 1.18 wt. percent palladium. Polyethylene is then formed in the larger pores as in Example 1.

EXAMPLE 4

An electrode is prepared as in Example 1 except that it is impregnated with a NiO—LiO catalyst by soaking in a solution consisting of 95 parts by weight of a 60 wt. percent aqueous nickel nitrate solution and 5 parts by weight of a solution made up of 20 wt. percent LiOH and 80 wt. percent of 1 molar $HNO_3$. After soaking, the electrode is dried and heated in a stream of nitrogen at 1000° F. for about 2 hours. Polyethylene is then formed in the larger pores as in Example 1.

EXAMPLE 5

An electrode is prepared as in Example 3 except that the catalyst impregnated carbon mass is used without coating the larger pores.

EXAMPLE 6

A fuel cell is operated at a temperature of about 180° F. at 1 atmosphere pressure. Molecular oxygen is employed as the oxidant and a 27 wt. percent aqueous solution of KOH is used as the electrolyte. The platinum impregnated electrode of Example 2 is employed as the anode (fuel electrode). Tests are then conducted using first the palladium impregnated and polymer coated electrode of Example 3 as the cathode (oxygen electrode), then removing this electrode and replacing it with the palladium impregnated electrode of Example 5.

Currents of 0.50, 0.75 and 1.0 ampere are drawn from the cell using each cathode at each amperage and the same fuel electrode for all tests to determine the effect of polarization at the cathode with each electrode used there.

The results of these tests are set forth in Table I. The polarization at each electrode is determined by measuring the potential difference between a standard calomel half-cell and each of the cathodes when they were under the various current loads. By keeping all other conditions constant the difference of potential, i.e. electromotive force, at the oxygen electrode when different oxygen electrodes are tested is the measure of polarization at such electrode.

*Table I*

| Oxygen Electrode (Cathode) | Current (Amperes) | Polarization at Oxygen Electrode (Volts) |
|---|---|---|
| Electrode of Example 3 (polymer coated-palladium impregnated-porous carbon) | 0.50<br>0.75<br>1.00 | 0.14<br>0.18<br>0.21 |
| Electrode of Example 4 (palladium impregnated-porous carbon) | 0.50<br>0.75<br>1.00 | 0.39<br>0.50<br>0.60 |

EXAMPLE 7

Example 6 is repeated except that the cell is operated at 350° F. and 300 p.s.i. and the electrode of Example 4 is compared at the cathode with another electrode prepared in the same manner except for the coating of the larger pores with hydrocarbon polymer. The superiority of the polymer coated electrode over the non-coated electrode is demonstrated by continued high performance of the former and progressively decreasing performance of the latter.

EXAMPLE 8

The polymer coated electrodes of the preceding examples are tested in a fuel cell employing first HCl and then $H_2SO_4$ electrolytes. The polymer remains in place in the pores and flooding does not occur as with uncoated electrodes.

EXAMPLE 9

Example 7 is repeated. The electrodes are prepared as in Example 1 except that different catalysts are employed as in Examples 2 and 3 and in coating the larger pores of the carbon mass propylene is used in lieu of the ethylene monomer.

Other electrodes are prepared with 3-methyl butene-1, 1,4-methyl pentene-1 and 4,4 dimethyl pentene-1 being used in lieu of the ethylene monomer.

These electrodes are then used in a cell operated in accordance with Example 6 except that a temperature of 300° F. and a pressure of 400 p.s.i.g. are used. Flooding of the coated pores is not encountered and the polymers remain in place after extended periods of use.

All percentages herein expressed refer to weight percent unless otherwise designated or defined.

The symbol "A." is employed herein to designate angstroms or angstrom units of linear measure, i.e. 1/10000 microns.

The term "high density carbon" is used herein to refer to a carbon mass having an apparent density of about 1.2 to about 2.1 grams/cc.

The term "low density carbon" is used herein to refer to a carbon mass having an apparent density of below about 1.2 grams/cubic centimeter.

The terms "apparent density" and "bulk density" as used herein refer to the weight of a cubic centimeter of porous material, no allowance being made for empty space therein constituting the porosity of such material.

The term "actual density" as used herein refers to the weight of a cubic centimeter of porous material, allowance being made for the porosity of such material, i.e. the weight of a cubic centimeter of the material in a non-porous solid state.

The terms "fuel cell reactant," "fuel cell fluid reactant," "fuel cell reactant fluid," "reactant fluid" and "reactant" are used herein to mean reactants taking part as such in the electrochemical reaction of the fuel cell including the source of oxygen, i.e. molecular oxygen, or an oxygen-containing gas, e.g. air, and the source of fuel which may be hydrogen, carbon monoxide, hydrocarbons or oxygenated hydrocarbons, but excluding the electrolyte employed in the cell even though such electrolyte participates in the electrochemical reaction as a reactant.

The terms "source of fuel," "fuel source," "fluid fuel source" and "vaporized fuel source" are used herein to refer to the fuel cell reactants to be oxidized in the fuel cell, i.e. hydrogen, carbon monoxide, hydrocarbons and oxygenated hydrocarbons.

The term "porosity" is used herein in its conventional sense, i.e. a condition in which a solid body is penetrated by minute open spaces which may be filled with either liquids or gases. This porosity is expressed as the percentage of open-space volume with respect to the total volume.

The particular periodic table referred to herein is the 1959 revised edition of the table designed in 1924 by Henry D. Hubbard, revised since 1940 by William F. Meggers and published by W. M. Welch Mfg. Co., Chicago, Illinois.

This application is a continuation-in-part of application S.N. 832,419, filed May 7, 1959, and now abandoned.

What is claimed is:

1. In a catalytic electrode comprising an electrically conductive porous structure having major pores whose diameters range between $0.2 \times 10^4$ A. and $2 \times 10^5$ A. interlaced therethrough and intersected by a series of minor pores whose diameters range between about 50 and 400 A. for use in an electrochemical process wherein a reactant gas is brought into contact with a liquid electrolyte within said major pores, the improvement which comprises a coating on surfaces of said structure which form walls of said major pores consisting of a solid, high molecular weight polymer formed in situ upon said surfaces, said polymer having a lower free surface energy than said structure and being of a thickness admitting of passage of said gas through said major pores.

2. In a catalyst-bearing electrode comprising a porous carbon structure having major pores whose diameters range between $0.2 \times 10^4$ A. and $2 \times 10^5$ A. interlaced therethrough and intersected by a series of minor pores whose diameters range between about 50 and 400 A. for use in an electrochemical process wherein a reactant gas is brought into contact with a liquid electrolyte within said major pores, the improvement which comprises a film of a solid polymer having a molecular weight above about 50,000 which has been formed by polymerization of a $C_2$–$C_7$ olefin in situ upon surfaces of said structure which form walls of said major pores, said film being of a thickness in the range of 2 to 200 millimicrons and admitting of passage of said gas through said major pores to contact said liquid electrolyte while in contact with said structure.

3. In a catalytic electrode comprising a porous carbon structure having major pores whose diameters range between $0.2 \times 10^4$ A. and $2 \times 10^5$ A. interlaced therethrough and intersected by a series of minor pores whose diameters range between 50 and 400 A. for use in an electrochemical process wherein a reactant gas is brought into contact with a liquid electrolyte within said major pores, the improvement which comprises a film of a solid hydrocarbon polymer formed by polymerization of an olefin selected from the group consisting of ethylene, propylene, 3-methylbutene-1, 4-methylpentene-1 and 4,4-dimethylpentene-1 in situ upon surfaces of said structure which form walls of said major pores said film admitting of passage of said gas through said major pores and being of a thickness in the range of 2 to 200 millimicrons.

4. In an electrode comprising in combination a metal comprising catalyst and an electrically conductive porous structure having major pores whose diameters range between $0.2 \times 10^4$ A. and $2 \times 10^5$ A. interlaced therethrough and intersected by a series of minor pores whose diameters range between 50 and 400 A. for use in a device wherein electrical energy is generated by electrochemical oxidation of a fluid combustible fuel and wherein a reactant gas is brought into contact with a liquid electrolyte within said major pores, the improvement which comprise a coating on surfaces of said structure which form walls of said major pores consisting of a solid organic polymer formed in situ, said polymer having a viscosity molecular weight of above about 50,000, a lower free surface energy than said structure, and a thickness in the range of about 2 to 1000 millimicrons.

5. An electrode in accordance with claim 4 wherein said polymer is polyethylene.

6. A process for coating selected surfaces of a porous electrode having a series of major pores whose diameters are in excess of about $0.2 \times 10^4$ A. interlaced therethrough and intersected with a series of minor pores whose diameters range between 50 and 400 A. for use in an electrochemical process wherein a reactant gas is brought into contact with a liquid electrolyte within said major pores which comprises contacting said electrode with gas until said gas enters and occupies space in said pores, contacting said electrode with a liquid containing a polymerization catalyst, reducing the pressure upon said electrode to a subatmospheric pressure sufficiently low to cause said gas to escape from a major portion of said major pores and allow said liquid to enter same and which is sufficiently high to prevent displacement of said gas from minor pores of lesser diameter, maintaining said liquid in said major pores until said catalyst is adsorbed upon electrode surfaces forming walls of said major pores, removing unadsorbed liquid from said major pores, contacting said electrode with a solution of a monomer which polymerizes in contact with said catalyst, maintaining a supply of said monomer in contact with said catalyst until a film of the resulting polymer is formed upon said electrode surfaces to a thickness that admits of passage of a gas through the resulting polymer coated pores and is within a range of 2 to 1000 millimicrons, and removing remaining amounts of said solution from said polymer coated pores when said thickness is within said range.

7. A process in accordance with claim 6 wherein said polymer is a hydrocarbon polymer having a viscosity molecular weight of above about 50,000 and said monomer is a $C_2$–$C_7$ aliphatic olefin, said polymerization catalyst contains a reducible transition metal compound the metal constituent of which is selected from the group consisting of two metals of groups IV–B, V–B and VI–B of the periodic table and an alkyl metal compound wherein the metal constituent is selected from the group consisting of metals of groups I, II and III of the periodic table.

8. A process in accordance with claim 6 wherein said monomer is ethylene.

9. A process in accordance with claim 6 wherein said dilute solution is removed from said electrode when said film is of a thickness not less than 2 nor greater than 200 millimicrons.

10. A process in accordance with claim 6 wherein said polymer is formed at a temperature in the range of 20° to 100° C.

11. A process for coating selected surfaces of a porous carbon electrode having a series of major pores whose diameters range above about 8000 A. interlaced therethrough and intersected with a series of minor pores whose diameters range between about 50 and 400 A. for use in an electrochemical process wherein a reactant gas is brought into contact with a liquid electrolyte within said major pores, which comprises contacting said electrode with an inert gas until said inert gas enters and occupies space in said pores, contacting said electrode with a liquid solution containing a polymerization catalyst, reducing the pressure upon said electrode to a subatmospheric pressure sufficient to cause displacement of said inert gas from said major pores with said liquid solution but insufficient to displace said inert gas from said minor pores, maintaining said liquid solution in said major pores until said catalyst is adsorbed upon electrode surfaces forming walls of said major pores, removing unadsorbed liquid from said major pores, contacting said electrode with a hydrocarbon mixture containing an olefinic monomer which polymerizes in contact with said catalyst, the concentration of said monomer in said mixture being sufficient to form, when polymerized, a film upon electrode surfaces forming walls of said major pores, of a thickness in the range of about 2 to 2000 millimicrons but insufficient to close said pores to passage of a gas, maintaining said monomer in contact with said catalyst at a temperature in the range of about 20° to 100° C. until said film is formed by polymerization of said monomer in situ and removing the unpolymerized remainder of said mixture from said electrode.

12. A process in accordance with claim 11 wherein said subatmospheric pressure is about 15 centimeters mercury.

13. A process in accordance with claim 11 wherein said polymerization catalyst comprises a reducible transition metal compound wherein the metal constituent is selected from the group consisting of metals of groups IV–B, V–B and VI–B of the periodic table and an alkyl metal compound wherein the metal constituent is selected from the group consisting of groups I, II and III of said table.

14. A process in accordance with claim 13 wherein said transition metal compound and said alkyl metal compound are adsorbed on said electrode from separate solutions separately introduced into said major pores.

15. A process for coating selected surfaces of a porous carbon comprising electrode having a series of major pores whose diameters range between about $0.2 \times 10^4$ A. and $2 \times 10^5$ A. interlaced therethrough and intersected with a series of minor pores whose diameters range between about 50 to 400 A. for use in an electrochemical process wherein electrical energy is generated by electrochemical oxidation of an organic fuel and wherein a reactant gas is brought into contact with a liquid electrolyte within said major pores, which comprises contacting said electrode with an inert gas until said inert gas enters and occupies essentially all of the space in both major and minor pores, immersing said electrode in a first solution containing a reducible transition metal compound wherein the metal constituent is selected from the group consisting of metals of groups IV–B, V–B and VI–B of the periodic table, reducing the pressure on said structure to a subatmospheric pressure at which said inert gas escapes from pores of a predetermined minimum size within said series of major pores, and said first solution enters the thus evacuated pores, maintaining said first solution in contact with said structure until said transition metal compound is adsorbed on surfaces of said electrode which form the pores to which said first solution has been admitted, removing unadsorbed amounts of said first solution from said electrode, maintaining essentially the same subatmospheric pressure employed while introducing said first solution into said pores of predetermined size and introducing thereto a second solution containing an alkyl metal compound wherein the metal constituent is selected from the group consisting of metals of groups I, II and III of the periodic table until said alkyl metal compound is adsorbed on said surfaces; removing unadsorbed amounts of said second solution from said electrode, immersing said electrode in a liquid under essentially the same subatmospheric pressure employed while introducing said first and second solutions into said pores of predetermined size, said liquid containing a $C_2$-$C_7$ aliphatic olefin diluted with a saturated hydrocarbon so that the concentration of olefin in said pores is sufficient when polymerized to form a film upon said surfaces of a thickness in the range of about 2 to 200 millimicrons, maintaining said olefin in contact with said adsorbed transition metal compound and said alkyl metal compound at a temperature in the range of about 20° to 100° C. until a solid polymer of said olefin is formed on said surfaces having a thickness in the range of 2 to 200 millimicrons, removing the unpolymerized remainder of said liquid from said electrode and removing polymerized olefin from exterior surfaces of said electrode.

16. A process in accordance with claim 15 wherein said major pores are flushed with an alcohol quench after said polymer film is of a thickness between 2 and 200 millimicrons.

References Cited in the file of this patent
UNITED STATES PATENTS

| | | |
|---|---|---|
| 2,384,463 | Gunn et al. | Sept. 11, 1945 |
| 2,669,598 | Kordesch | Feb. 16, 1954 |
| 2,738,375 | Schlotter | Mar. 13, 1956 |
| 2,935,547 | Kordesch | May 3, 1960 |
| 2,938,064 | Kordesch | May 24, 1960 |